United States Patent [19]
Yoshimura

[11] Patent Number: 5,131,294
[45] Date of Patent: Jul. 21, 1992

[54] LINE PRESSURE CONTROL SYSTEM FOR AUTOMATIC TRANSMISSION

[75] Inventor: Hiroshi Yoshimura, Hiroshima, Japan

[73] Assignee: Mazda Motor Corporatioon, Hiroshima, Japan

[21] Appl. No.: 740,385

[22] Filed: Aug. 5, 1991

[30] Foreign Application Priority Data

Aug. 3, 1990 [JP] Japan .................. 2-204995

[51] Int. Cl.$^5$ ............................ B60K 41/02
[52] U.S. Cl. ........................ 74/858; 74/866
[58] Field of Search ................. 74/858, 866

[56] References Cited

U.S. PATENT DOCUMENTS

| | | | |
|---|---|---|---|
| 4,226,141 | 10/1980 | Espenschied | 74/858 OR |
| 4,283,970 | 8/1981 | Vukovich | 74/866 |
| 4,347,761 | 9/1982 | Ahlen | 74/866 X |
| 5,036,728 | 8/1991 | Kawasoe et al. | 74/858 OR |
| 5,043,894 | 8/1991 | Yamaguchi | 74/858 X |

FOREIGN PATENT DOCUMENTS 62-188842 8/1987 Japan .

Primary Examiner—Rodney H. Bonck
Assistant Examiner—Daniel Wittels
Attorney, Agent, or Firm—Fleit, Jacobson, Cohn, Price, Holman & Stern

[57] ABSTRACT

An automatic transmission system includes a regulator for regulating line pressure delivered to friction coupling elements of a transmission mechanism. The friction coupling elements are selectively coupled and released, in combination, so as to shift gear ratios. A control device controls the regulator so as to provide a proper line pressure. The control device operates to learn a correction value for the line pressure which depends upon a shift-time it takes for the transmission to complete an up-shift and corrects the line pressure according to the correction value learned from an actual shift-time. Thus, an up-shifting of the transmission is completed in a desired shift-time. The correction of the line pressure in the learning control is practically performed when the number of engine cylinders for which fuel delivery is cut off is smaller than a predetermined number.

13 Claims, 14 Drawing Sheets

FIG. 3

| REF. NO. | 24 | CLUTCH MEANS 20 | 21 | 27 | BRAKE MEANS 25 | 23 | ONE-WAY CLUTCH 26 | 22 |
|---|---|---|---|---|---|---|---|---|
| P | | | | | | | | |
| R | ○ | | | | | | | |
| N | | | | | | | | |
| D 1st GEAR | | ○ | | | | | (○) | (○) |
| D 2nd GEAR | | ○ | | | | ○ | | (○) |
| D 3rd GEAR | | ○ | ○ | ○ | | | | (○) |
| D 4th GEAR | | ○ | | ○ | | ○ | | |
| 2nd 1st GEAR | | ○ | ○ | | | | (○) | (○) |
| 2nd 2nd GEAR | | ○ | ○ | ○ | | | | (○) |
| 2nd 3rd GEAR | | ○ | ○ | | ○ | | | (○) |
| 1st 1st GEAR | | ○ | ○ | | | | | (○) |
| 1st 2nd GEAR | | ○ | ○ | | | ○ | | (○) |

LINE PRESSURE CONTROL

OFF-SHIFTING LINE PRESSURE CONTROL

ON-SHIFTING LINE PRESSURE CONTROL

DUTY RATE DETERMINATION

| SHIFT PATTERN \ TVO | 0/8 | 1/8 | ... | 7/8 | 8/8 |
|---|---|---|---|---|---|
| 1→2 | (PL) | ---- | | ---- | ---- |
| 1→3 | ---- | ---- | | ---- | ---- |
| 1→4 | ---- | ---- | | ---- | ---- |
| 2→3 | ---- | ---- | | ---- | ---- |
| 2→4 | ---- | ---- | | ---- | ---- |
| 3→4 | ---- | ---- | | ---- | ---- |

POWER MODE / ECONOMY MODE

| SHIFT PATTERN \ TS | 0 | 750 | | 5250 | 6000 |
|---|---|---|---|---|---|
| 3→2 | (PLo) | ---- | | ---- | ---- |

| SHIFT PATTERN | 1→2 | 2→3 | 3→4 |
|---|---|---|---|
| TARGET SHIFT-TIME $T_0$ (sec) | 0.8 | 0.6 | 0.6 |

| THROTTLE OPENING (TVO) | 1/8 | 2/8 | 3/8 | 4/8 | 5/8 | 6/8 ~ 8/8 |
|---|---|---|---|---|---|---|
| WEIGHTING COEFFICIENT: Cw | $1+a_5$ | $1+a_4$ | $1+a_3$ | $1+a_2$ | $1+a_1$ | 1 |

LINE PRESSURE CONTROL SYSTEM FOR AUTOMATIC TRANSMISSION

This invention relates to a line pressure control system for an automatic transmission and more particularly, to a control system for controlling or regulating the line pressure including a learning control for shifting an automatic transmission.

BACKGROUND OF THE INVENTION

1. Field of the Invention

Typically, automatic transmissions for automotive vehicles have a hydraulic torque converter and a multi gear ratio shift transmission comprising a planetary gearset. Such an automatic transmission is provided with shift control elements, such as friction clutches and friction brakes, which are selectively coupled and released by various solenoid valves in a hydraulic control circuit so as to shift the automatic transmission into any desired gear ratio.

2. Description of Related Art

The line pressure in a hydraulic control circuit of an automatic transmission is maintained by an oil pump and a pressure regulating valve. If the line pressure is too high during shifting of transmission gear ratios, the shift control elements or friction coupling elements are rapidly coupled, so that the automatic transmission generates what are called "shift shocks". On the other hand, if the line pressure is too low during shifting of the transmission gear ratios, the shift control elements need a long time to be coupled, and are subjected to excessive wear and heat.

Some automatic transmissions of this kind have a hydraulic control circuit which, in addition to controlling the automatic transmission line pressure so as to gradually change a coupling friction of the friction coupling element during shifting transmission gear ratios, regulates the line pressure during feedback control so as to adjust a gear ratio shift-time necessary to actually shift the automatic transmission as rapidly as possible in a predetermined target shift-time. Such an automatic transmission line pressure control system is known from, for instance, U.S. Pat. No. 4,283,970, entitled "Automatic Transmission Line Pressure Control," issued on Aug. 18, 1981.

Recently, a timing at which the fricitional coupling element is coupled and released has been optimized by adjusting a gear ratio shift-time so that the automatic transmission completes shifting to the predetermined target shift-time by learning a shift-time and correcting the line pressure according to the learned shift-time. Further, in order to control the shift shock generated by the automatic transmission during shifting, it has been proposed to cut fuel supply into engine cylinders so as to reduce or drop the engine output torque during shifting of transmission gear ratios.

If fuel supply into all cylinders of the engine is cut, the transmission shift-time is shortened due to a decrease in output torque of the engine. Accordingly, the automatic transmission line pressure is intentionally dropped to some extent in an attempt to regulate the gear ratio shift-time. However, in this case, a change in gear ratio shift-time, caused due to a drop in automatic transmission line pressure, is quite small. This results in a miscalculation of the learning value of line pressure correction when the fuel cut control for all cylinders of the engine and the correction learning control of the automatic transmission line pressure are executed all at once during shifting of automatic transmission gear ratios.

SUMMARY OF THE INVENTION

It is, therefore, a primary object of the present invention to provide a line pressure control system for controlling or regulating the line pressure in an automatic transmission with learning control so as to selectively couple various friction coupling elements for shifting transmission gear ratios.

It is another object of the present invention to provide a line pressure control system for controlling or regulating the line pressure in an automatic transmission with learning control so that an incorrect learning of correction value for the line pressure due to cutting of fuel delivery to cylinders of the engine is prevented.

These objects of the present invention are achieved by a line pressure control system for an automatic transmission having a multi gear ratio transmission for use with a multi cylinder engine which includes a hydraulic pressure regulator for regulating the line pressure delivered to friction coupling elements of the multi gear ratio transmission. The friction coupling elements are selectively coupled and released so as to place the automatic transmission into any desired gear ratio. Line pressure control means are provided for controlling the hydraulic pressure regulator so as to provide a proper line pressure.

The pressure control means includes a line pressure learning correction control for learning a correction value for the line pressure which is determined depending upon a shift-time during which the automatic transmission has completed a shifting of gear ratios and corrects the line pressure according to the learned value of correction from an actual shift-time so as to complete a shifting of gear ratios of the automatic transmission in an optimum shift-time. The line pressure learning correction control performs the correction of the line pressure in a learning control when the number of engine cylinders, for which fuel delivery is cut and which is different according to shift patterns of the automatic transmission, is judged to be smaller than a predetermined number.

According to the line pressure control system for an automatic transmission of the present invention, because, upon shifting transmission gear ratios, a judgement is made, according to the number of engine cylinders for which fuel delivery is cut, as to whether a correction of the line pressure in the automatic transmission must be executed in learning control, a miscalculation of the learning value of correction for the line pressure, when the regulation of line pressure is insufficient for transmission shift-time control, can be prevented.

BRIEF DESCRIPTION OF THE DRAWINGS

The above and other objects and features of the present invention will be apparent to those skilled in the art from the following detailed description of a preferred embodiment thereof when considering in conjunction with the accompanying drawings, in which:

FIG. 3 is a table showing actuation of friction coupling elements for providing various transmission shift modes and transmission gear ratios;

DETAILED DESCRIPTION OF THE PREFERRED EMBODIMENT

Figure 1:
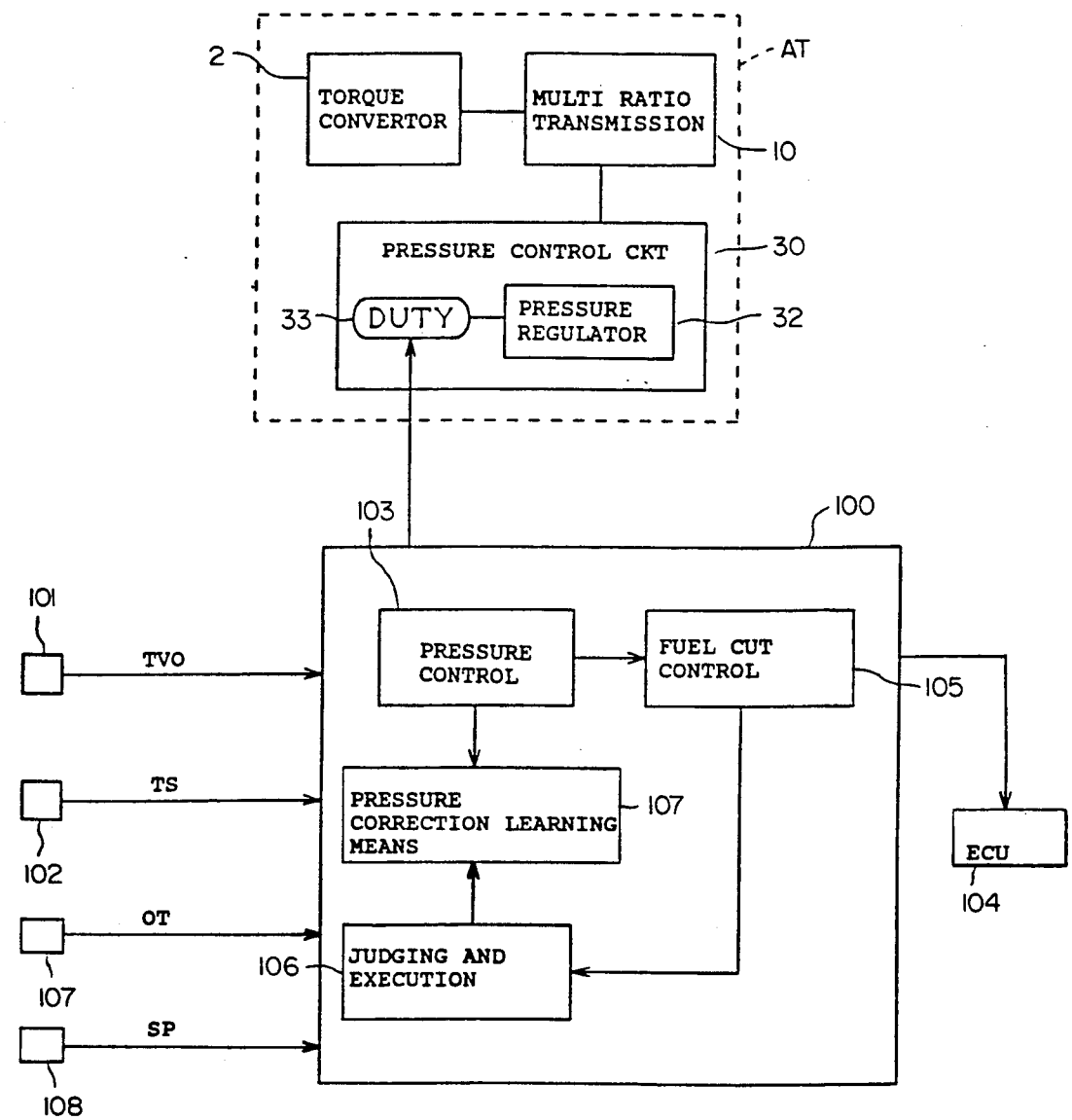
FIG. 1 is a block diagram illustrating a schematic overall structure of an automatic transmission line pressure control system in accordance with a preferred embodiment of the present invention.

Referring to the drawings in detail and, in particular, to FIG. 1, an automatic transmission AT having a line pressure, which is controlled by an electronic control unit (ECU) 100 serving as a pressure controller according to a preferred embodiment of the present invention is schematically illustrated in block diagram. The transmission comprises a hydraulic torque convertor 2, a multi gear ratio shift mechanism or transmission 10 and a line pressure control circuit 30, all of which are well known in structure and operation and may be of any known type. The multi gear ratio transmission 10 has various friction coupling elements, such as brakes and clutches, which are selectively coupled and released by the line pressure control circuit 30 so as to selectively place the automatic transmission into various gear ratios. The line pressure control circuit 30 has a pressure regulator or regulating valve 32 and a duty solenoid valve 33 for operating the pressure regulating valve 32 at a desired duty rate for variably regulating the line pressure delivered to the friction coupling elements of the multi gear ratio transmission 10. This line pressure control circuit 30 is controlled in operation by the electronic control unit (ECU) 100 mainly comprising a general purpose microcomputer.

Electronic control unit (ECU) 100 provides a pressure control 103, fuel cut control 105, judging and execution control 106, and learning control 107. Each of these controls is schematically represented by a box in FIG. 1. The pressure control 103 variably controls the duty rate of the duty solenoid valve 33 of the line pressure control circuit 30 so as to regulate the line pressure delivered to the friction coupling elements of the multi gear ratio transmission 10. The fuel cut control 105 governs an engine control unit (ECU) 104 to cut fuel supply to appropriate numbers of cylinders of the engine according to gear ratio shift patterns. The judging control 106 decides whether the regulation of line pressure must be executed by a learning control based on the number of cylinders which are under fuel cut control. The learning control 107 executes a correction of line pressure based on the number of fuel cut cylinders determined during the judging control 106. The electronic control unit (ECU) 100 receives signals representative of a throttle valve opening (TVO) of a throttle valve (not shown), a turbine speed (TS) of the torque convertor 2, an oil temperature (TO) of oil in the automatic transmission AT, and a shift position (SP) of an manual shift lever MSL (see FIG. 4) from sensors 101, 102, 107 and 108, respectively, all of which are well known.

Figure 2:
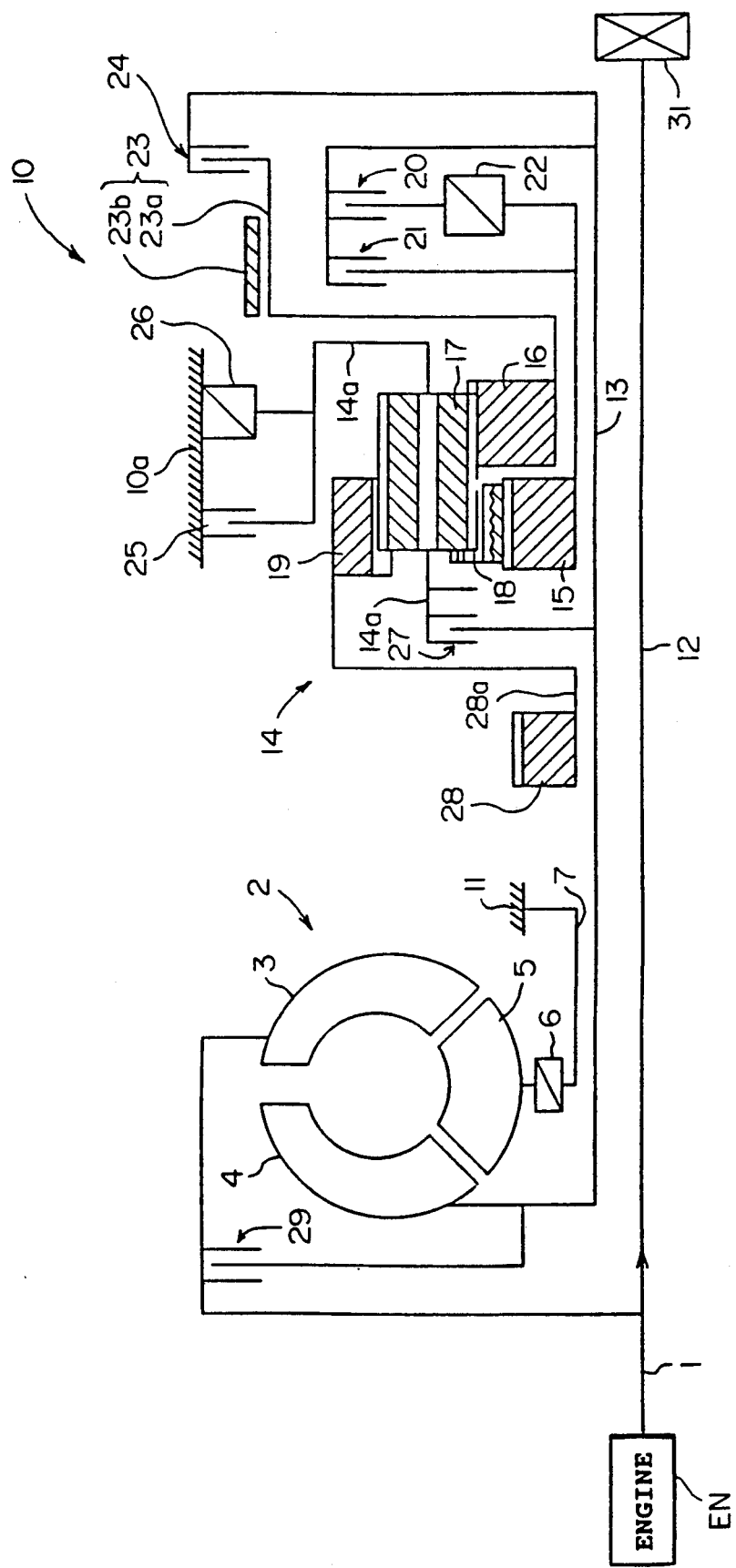
FIG. 2 is a schematic illustration showing the mechanical structure of an automatic transmission of FIG. 1.

Referring to FIG. 2, schematically showing the automatic transmission AT, which has line pressure that is controlled by the electronic control unit (ECU) 100, the automatic transmission AT includes the torque convertor 2 which, in turn, is connected to an engine output shaft 1 and is equipped with lock-up clutch means 29. The multi gear ratio transmission 10 is disposed on the output side of the torque convertor 2. The torque convertor 2 comprises a pump impeller 3 connected or coupled to an engine output shaft 1, such as an engine crankshaft, a turbine 4, and a stator 5 connected or mounted on a stationary shaft 7 secured to a housing 11 through one-way clutch means 6. The torque convertor 2, equipped with the lock-up clutch means 29, is well known in structure and operation and may be of any known type.

The multi gear ratio transmission 10 has a center or inner shaft 12 having an end connected to an oil pump 31 and driving the oil pump 31. The multi gear ratio transmission 10 further has a hollow outer shaft or turbine shaft 13 through which the inner shaft 12 passes and which is connected to the turbine 4 of the torque convertor 2. The turbine shaft 13 is connected or to a planetary gearset 14, comprising a small diameter sun gear 15, a large diameter sun gear 16, a long pinion gear 17, a short pinion gear 18 and a ring gear 19, equipped with various frictional coupling elements or means, such as clutch means and brakes means.

On one side of the planetary gearset 14, axially remote from a multi cylinder engine EN, there are disposed forward clutch means 20, first one-way clutch means 22 and coasting clutch means 21. The forward clutch means 20 is disposed between the turbine shaft 13 and the small gear 15 so that the turbine output transmitted from the turbine shaft 13 is connected to or cut off from the small sun gear 15 through the one-way clutch means 22. The coast clutch means 21 is disposed in parallel with the forward clutch means 20 between the turbine shaft 13 and the small sun gear 15 so as to connect or disconnect power between the turbine shaft 13 and the small sun gear 15. Radially outside the coast clutch means 21 there is disposed a 2-4 brake means 23 comprising a brake drum 23a coupled to the large sun gear 16 and a brake band 23b encircling the brake drum 23a. The 2-4 brake means 23 serves to stop the rotation of the large sun gear 16 when the brake band 23b is tightened. On one side of the 2-4 brake means 23 axially remote from the engine EN there is disposed reverse clutch means 24 which connects or disconnects power between the turbine shaft 13 and the large sun gear 16 through the brake drum 23a. Radially outside the planetary gearset 14 there is further disposed low-reverse brake means 25 between a carrier 14a of the planetary gearset 14 and a casing 10a of the multi gear ratio transmission 10 which locks and unlocks the carrier 14a and the casing 10a of the multi gear ratio transmission 10. Between the carrier 14a of the planetary gearset 14 and the casing 10a of the multi gear ratio transmission 10 there is also disposed a second one-way clutch means 26 in parallel with the low-reverse brake means 25. On another side of the planetary gearset 14, axially close to the engine EN, there is disposed a 3-4 shift (third speed gear ratio to fourth speed gear ratio) clutch means 27 between the turbine shaft 13 and the carrier 14a so that the turbine output transmitted from the turbine shaft 13 is connected to or cut off from the carrier 14a of the planetary gearset 14. An output gear 28, which is disposed on the other side of the planetary gearset 14, is coupled to the ring gear 19 through an output shaft 28a. These clutch means and brake means are selectively actuated as is shown in the table in FIG. 3 so as to place the multi gear ratio transmission 10 in any desired gear ratio. In the table shown in FIG. 3, circles indicate the clutch means 20, 21, 24 and 27, brake means 23 and 25 and one-way clutch means 22 and 26 which are actuated in the respective speed ranges (R, D, 2nd and 1st ranges).

Figure 4:
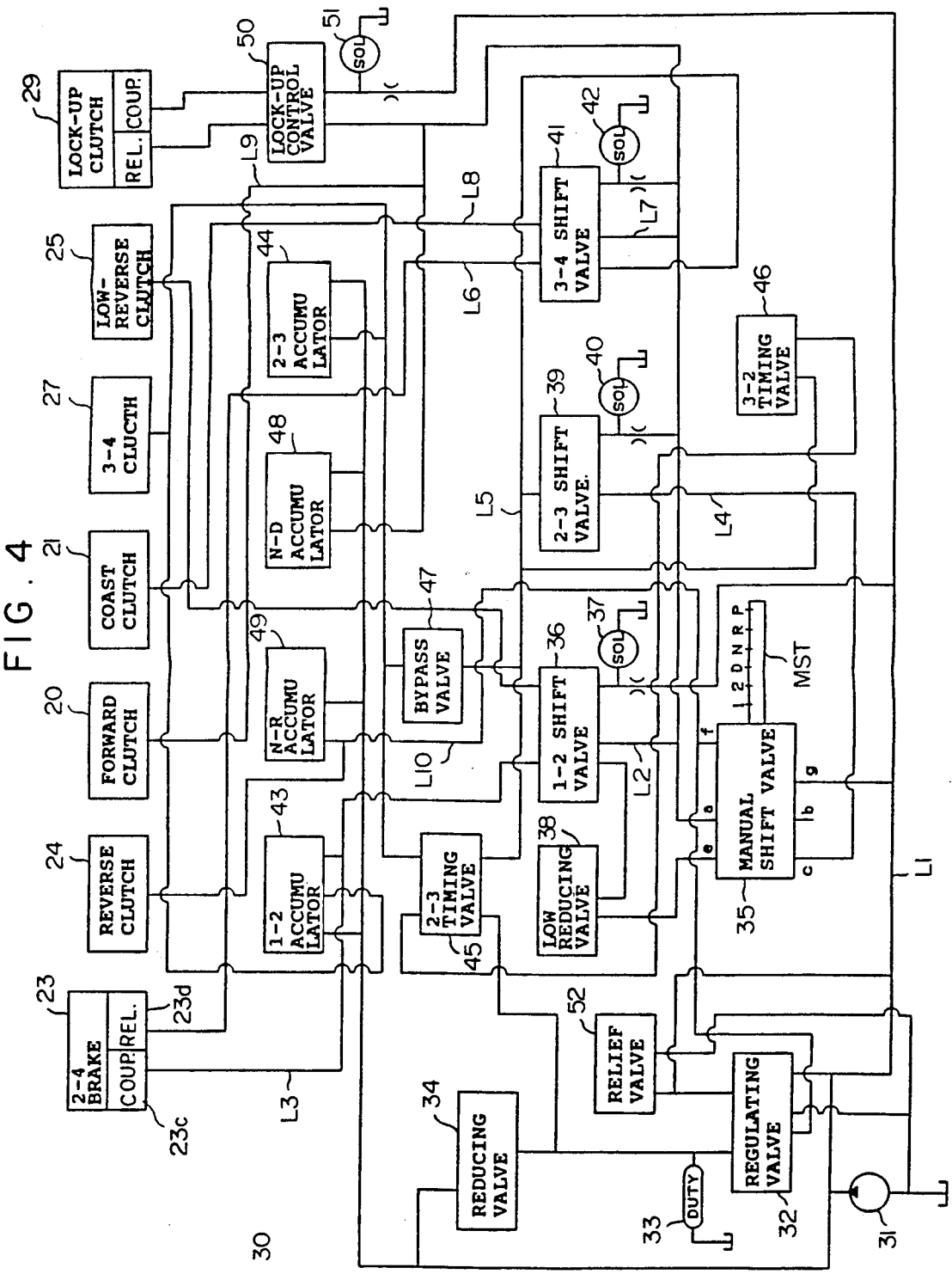
FIG. 4 is a block diagram of a hydraulic pressure control circuit.

Referring to FIG. 4, the line pressure control circuit 30 for controlling the line pressure delivered to the friction coupling elements or means of the multi gear ratio transmission 10 includes the oil pump 31. The engine EN, during operation, operates the oil pump 31 through the center or inner shaft 12 of the multi gear ratio transmission 10 coupled to the engine output shaft 1 so as to supply a hydraulic pressure medium, such as a working pressure oil, into a pressure line L1. After reducing the pressure of the working oil to a predetermined pressure by a pressure reducing valve 34, the working oil in the pressure line L1 is further regulated in pressure by a pressure regulating valve 32 controlled by the duty solenoid valve 33. That is, the duty solenoid valve 33 controls the amount of working oil drawn from the pressure reducing valve 34 according to the duty cycle thereof which governs the pressure of working oil. The pressure regulating valve 32 is supplied, as a pilot pressure, with the working oil at the regulated pressure and regulates a pressure in the pressure line L1 according to the pilot pressure. The duty cycle of the duty solenoid valve 33, and hence the line pressure in the pressure line L1, is controlled by the electronic control unit (ECU) 100.

Line pressure is supplied to an inlet port g of a select valve or manual shift valve 35 shiftable among six shift ranges, such as park (P), reverse (R), neutral (N), drive (D), second speed (2) and first speed (1) ranges. The manual shift valve 35 communicates the inlet port g with ports a and e when selecting the first speed range (1), with ports a and c when selecting second speed range (2), with ports a, b and c when selecting the drive (D) range, and with ports e and f when selecting the reverse (R) range. The port a of the manual shift valve 35 is connected, through a pressure line L2, to a 1-2 (first speed gear ratio to second speed gear ratio) shift valve 36 which is supplied with a pilot pressure controlled by a 1-2 shift solenoid valve 37. When the 1-2 shift solenoid valve 37 is turned off while the transmission is in the first speed gear ratio, the 1-2 shift valve 36 is actuated so as to communicate a pressure line L3 with its drain port. The pressure line L3 is connected to a pressure port or chamber 23c of the 2-4 brake means 23 for coupling the 2-4 brake means. When the 1-2 shift solenoid valve 37 is turned on during any one of the second, third and fourth speed gear ratios, the 1-2 shift valve 36 is actuated so as to communicate the port a of the manual shift valve 35 with the pressure port 23c of the 2-4 brake means 23, for coupling thereof, through the pressure line L3. The 1-2 shift valve 36, during the first speed gear ratio in the first speed (1st) range, is actuated so as to communicate the port e of the manual shift valve 35 with a pressure port of the low-reverse brake means 25 through a pressure reducing valve 38.

Hydraulic pressure at the port a of the manual shift valve 35, after being controlled by a 2-3 shift solenoid valve 40, is applied, as a pilot pressure, to a 2-3 shift valve 39. The 2-3 shift valve 39 is communicated with the manual shift valve 35 through the port c. When the 2-3 shift solenoid valve 40 is turned on when the transmission is in either of the first and second speed gear ratios, the 2-3 shift valve 39 is actuated so as to communicate a pressure line L5, connected to a pressure port of the 3-4 shift clutch means 27, with its drain port, thereby releasing the 3-4 shift clutch means 27. On the other hand, when the 2-3 shift solenoid valve 40 is turned off when the transmission is in either of the third and fourth speed gears, the 2-3 shift valve 39 is actuated so as to communicate the port c of the manual shift valve 35 with the pressure chamber of the 3-4 clutch means 27, for coupling thereof, through a pressure line L5. The 3-4 clutch means 27 is thereby coupled or locked.

The 3-4 shift valve 41, connected to the pressure line L5, is supplied with a pilot pressure provided at the port a of the manual shift valve 35 and is controlled by a 3-4 shift solenoid valve 42. When the 3-4 shift solenoid valve 42 is turned on when the transmission is in any of the first, second and fourth speed gear ratios in the drive (D) range and the first speed gear ratio in the second speed (2) range, the 3-4 shift valve 41 is actuated so as to communicate a pressure line L6, connected to a pressure chamber 23d of the 2-4 brake means 23, for releasing thereof, with a drain port thereof. On the other hand, when the 3-4 shift solenoid valve 42 is turned off when the transmission is in any of the third speed gear ratio in the drive (D) range, of the second, third speed gear ratios in the second speed (2nd) range, and of the first and second speed gear ratios in the first speed (1st) range, the 3-4 shift valve 41 is actuated so as to communicate the pressure line L6 with the pressure line L5, which, in turn, is connected to the 2-3 shift valve 39. Accordingly, supplying and draining of working oil in the pressure chamber 23d of the 2-4 brake means 23, for releasing thereof, is governed by the 2-3 shift valve 39. The 3-4 shift valve 41 is communicated with the port a of the manual shift valve 35 through a pressure line L7 and the coast clutch means 21 through a pressure line L8 so that the working oil supplied through the manual shift valve 35 is connected to or shut off from the pressure port or chamber of the coast clutch means 21, thereby coupling or releasing the coast clutch 21. In such a way as described above, the friction coupling means, namely, the 2-4 brake means 23 and the 3-4 clutch means 27, are controlled to be coupled and released in combinations as shown in the table in FIG. 3 according to operations of the shift valves 36, 39 and 41 controlled by the shift solenoid valves 37, 40 and 42, respectively. It is to be understood that the 2-4 brake means 23 is coupled only when the working oil is supplied into the coupling pressure chamber 23c and drawn from the releasing pressure chamber 23d. The 2-4 brake means is released under all conditions other than these.

The line pressure control circuit 30, in order to decrease shift shocks, has a 1-2 shift accumulator 43, a 2-3 shift accumulator 44, a 2-3 shift timing valve 45, a 3-2 shift timing valve 46 and a by-pass valve 47 disposed between the shift valves 36 39 and 41 and the 2-4 brake means 23 and the 3-4 clutch means. The line pressure control circuit 30 further has a pressure line L9 for supplying a working oil pressure from the port a of the manual shift valve 35 to the forward clutch means 20 so as to couple the forward clutch means 20 in any one of the drive (D), first (1st) and second (2nd) speed ranges, an N-D accumulator 48 connected to the forward clutch means 20, a pressure line L10 for supplying a working oil pressure from the port f of the manual shift valve 35 to the reverse clutch means 24 so as to couple the reverse clutch means 24 in the reverse (R) range, an N-R accumulator 49 connected to the reverse clutch means 24, a lock-up control valve 50 for controlling the lock-up clutch means 29, a lock-up solenoid valve 51 actuating the lock-up control valve 50, and a convertor relief valve 52.

The operation of the transmission line pressure control system depicted in FIGS. 1-4 is best understood by reviewing FIGS. 5-9, which are flow charts illustrating various routines and subroutines for a microcomputer of the electronic control unit 100. Programming a computer is a skill well understood in the art. The following description is written to enable a programmer having ordinary skill in the art to prepare an appropriate program for the microcomputer of the electronic control unit 100. The particular details of any such program would, of course, depend upon the architecture of the particular computer selected.

Figure 10:
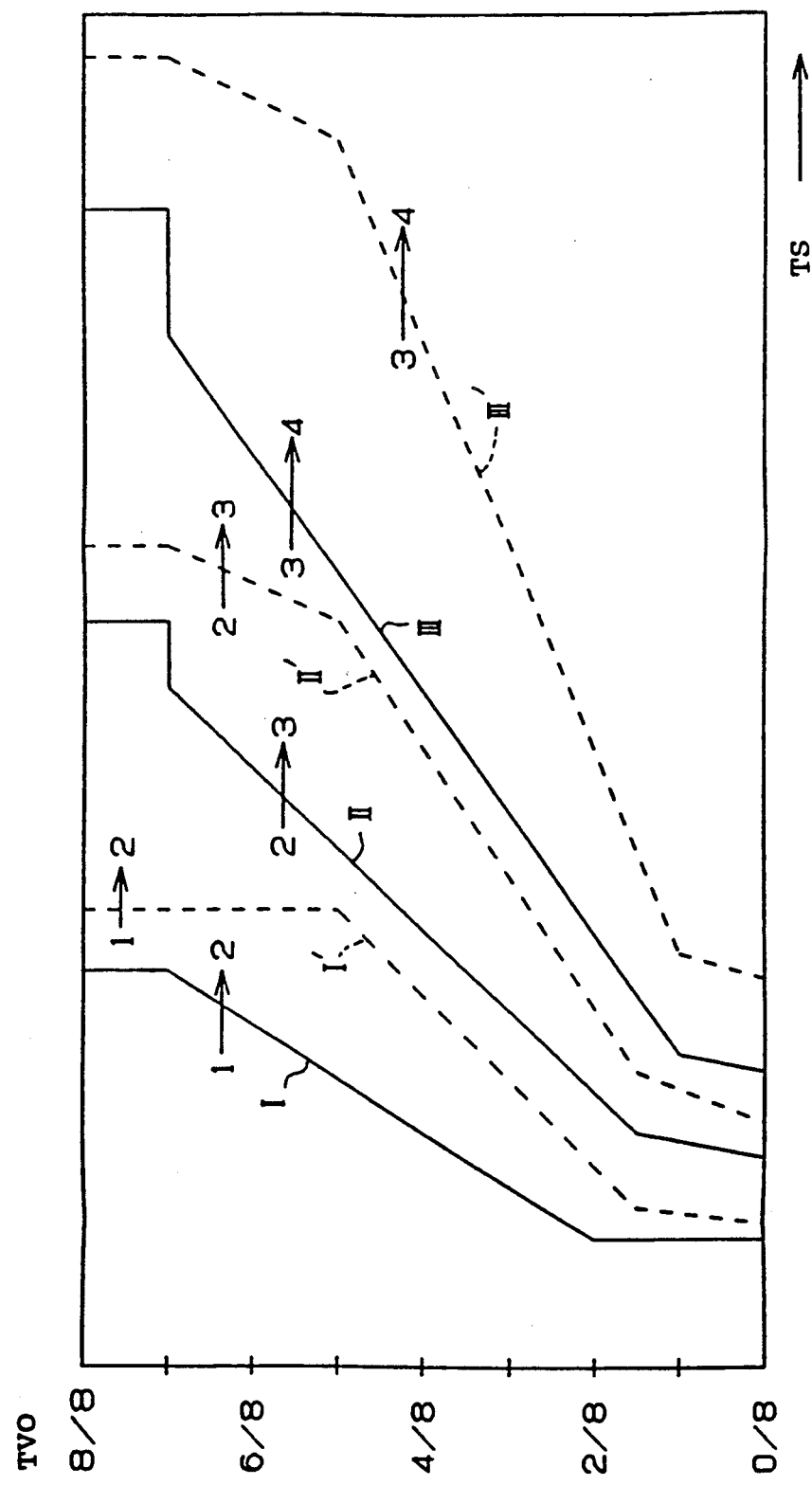
FIG. 10 is a map showing up-shifting patterns for economy and power modes.

The electronic control unit 100 has a shift-up control pattern map shown in FIG. 10 having data which is stored in the memory of the microcomputer. The shift control pattern map includes three shift-up lines for each of an economy drive mode and a power drive mode. The shift-up lines I, II and III are used for 1-2 (first to second speed gear ratio) shift, 2-3 (second to third speed gear ratio) shift and 3-4 (third to fourth speed gear ratio) shift, respectively, in the economy mode. The shift-up lines I', II' and III' are used for 1-2 shift, 2-3 shift and 3-4 shift, respectively, in the power mode. Each shift-up line I, II or III for the economy drive mode is established on a lower side of turbine speed than each corresponding shift-up line I', II' or III' for the power drive mode. Although the shift-up lines have been established using throttle opening and turbine speed as parameters in this embodiment, vehicle speed may be used in place of turbine speed as one of the two parameters. It is, of course, clear that the electronic control unit 100 also has a shift-down control pattern map (not shown in FIG. 10).

Main Routine

Figure 5:
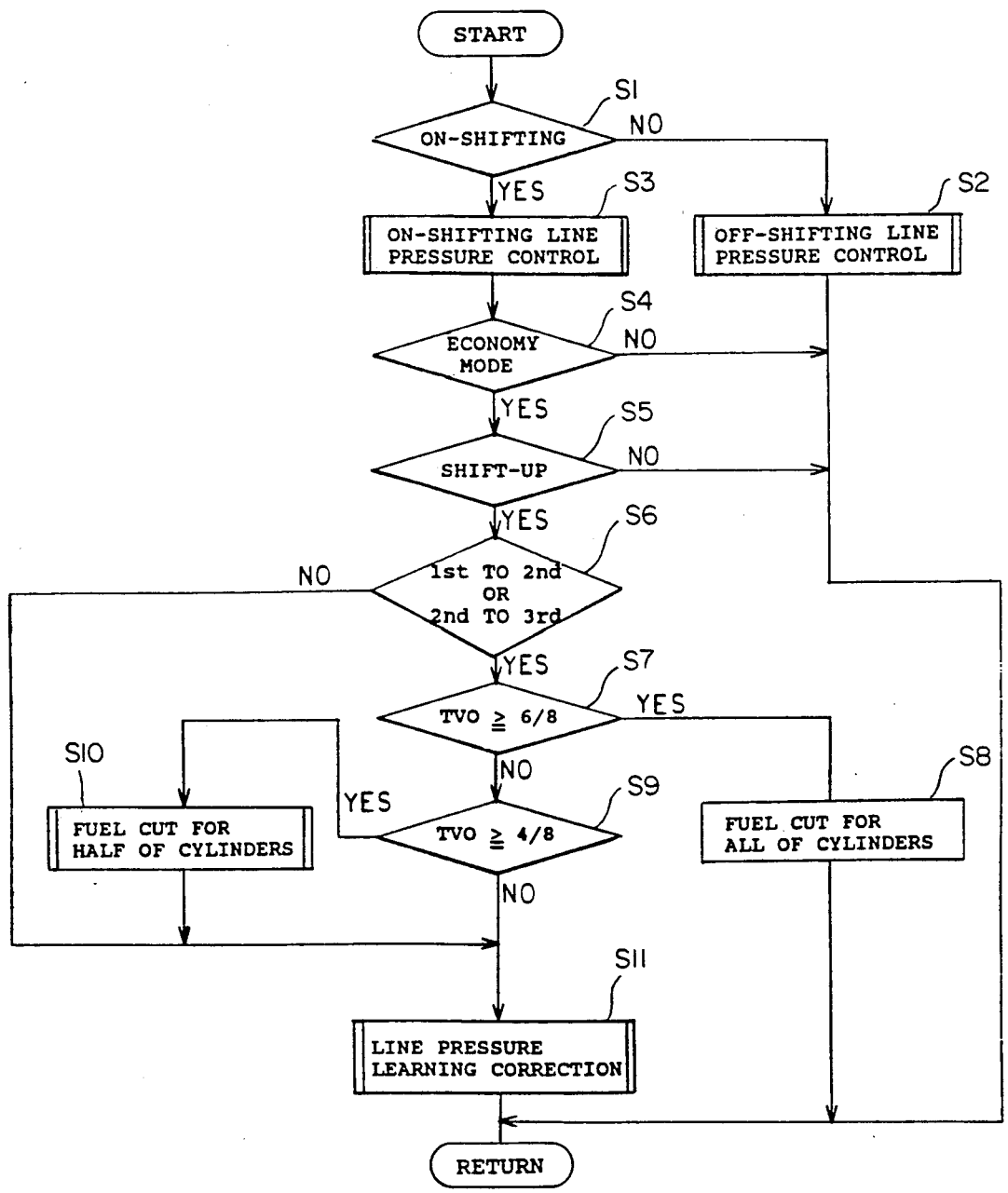
FIG. 5 is a flow chart illustrating a line pressure control main routine.

Referring now to FIG. 5, which is a flow chart of the line pressure control main routine for the microcomputer of the electronic control unit 100, the first step S1 is to make a decision a to whether the automatic transmission AT is currently shifting. If the answer to the decision is no, an off-shifting line pressure control subroutine is called for at step S2. On the other hand, if the answer to the decision is yes, an on-shifting line pressure control subroutine is called for at step S3. The off-shifting line pressure control subroutine at step S2 and the on-shifting line pressure control subroutine at step S3 will be described in detail later.

If the answer to the decision is yes and the on-shifting line pressure control subroutine is called for, decisions are made at steps S4 and S5 as to whether the economy drive mode is selected and whether the automatic transmission AT is currently up-shifting, respectively. If answers to both these decisions are yes, this indicates that the automatic transmission AT is up-shifting in the economy drive mode. Then, a decision is made at step S6 as to whether the automatic transmission AT is shifting up from the first speed gear to the second speed gear or from the second speed gear to the third speed gear. If the answer to the decision at step S6 is no, this indicates that the automatic transmission AT is shifting up from the third speed gear to the fourth speed gear. Then, a line pressure learning control subroutine, which will be described in detail later, is called for at step S11.

If the answer to the decision at step S6 is yes, this indicates that the automatic transmission AT is shifting up either from the first speed gear to the second speed gear or from the second speed gear to the third speed gear. Then, a decision is made at step S7 as to whether the throttle opening TVO is over 6/8 of its full opening. If the answer to this decision is yes, after causing the fuel cut control means 105 to provide a control signal for executing fuel cut for all of the cylinders of the engine EN at step S8, the line pressure control main routine orders return and is repeated. If the answer to the decision at step S7 regarding throttle opening TVO is no, 25 another decision is made at step S9 as to whether the throttle opening TVO is over 4/8 of its full opening. If the answer is yes, after causing the fuel cut control means 105 to provide a control signal for executing fuel cut for a half of the cylinders of the engine EN at step S10, a line pressure correction subroutine in shift time learning control is called for at step S11 which will be described in detail later. If the answer to the decision made in step S9 regarding throttle opening TVO is no, the line pressure correction subroutine in shift time earning control is called for at step S11 without providing any control signal for fuel cut.

If the answer to either of the decisions made at steps S4 and S5 is no, the line pressure control main routine orders return and is repeated.

As noted above, in the power mode, the shift-up lines of the shift control pattern map are established at relatively high turbine speeds or vehicle speeds as compared to the speeds at which the shift-up lines are established when the transmission is in the economy mode. Since vehicle speeds at which the automatic transmission AT is shifted up are high, so that the automatic transmission AT needs a long time to shift due to a high moment of inertia of rotating elements thereof, an optimum line pressure must be raised. Accordingly, if a correction value for line pressure learned in the power drive mode is used to control line pressure in the economy drive mode in which the shift-up lines of the shift control pattern map are established on a side of relatively low turbine speeds or vehicle speeds, the automatic transmission may possibly generate a shift shock. However, in this invention, because the line pressure correction subroutine in shift time learning control is executed in the economy mode only, depending on the answer to the decision at step S4, and the correction value for line pressure learned in the economy drive mode is used to control line pressure in the power drive mode, the automatic transmission AT is prevented from causing a shift shock.

Off-Shifting Line Pressure Control Subroutine

Figure 6:
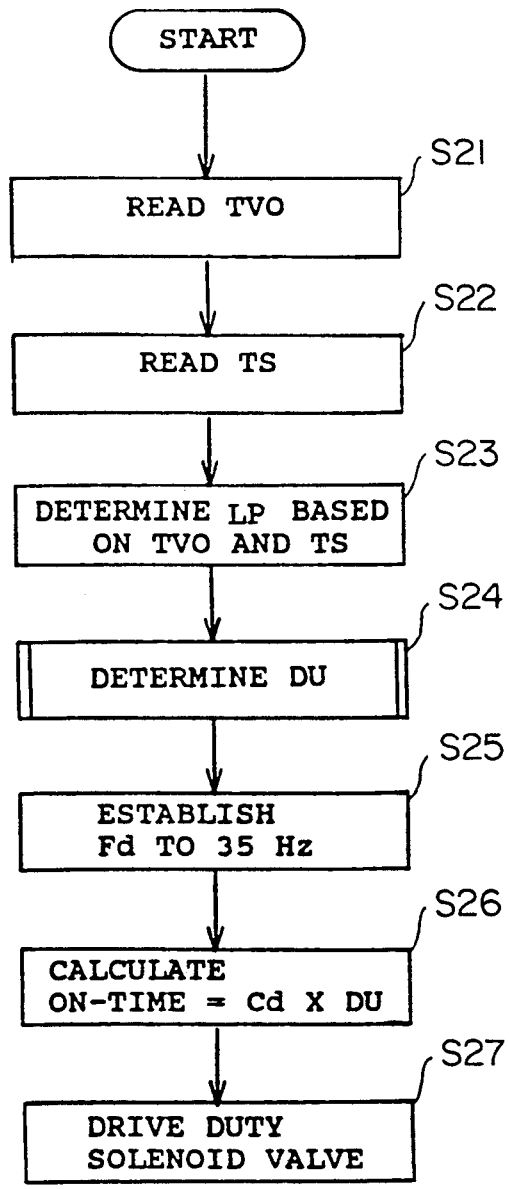
FIG. 6 is a flow chart illustrating an off-shifting line pressure control subroutine.

Referring to FIG. 6, showing a flow chart of the off-shifting line pressure control subroutine, which is called for when the answer to the decision at step S1 of the line pressure control main routine is no, after reading signals representative of a throttle valve opening TVO and a turbine speed TS from the throttle opening sensor 101 and the turbine speed sensor 102 at steps S21 and S22, respectively, a desired line pressure for off-shifting line pressure control is determined at step S23 according to the throttle opening and turbine speed read at steps S21 and S22. The relation of line pressure (LP) for off-shifting line pressure control to throttle valve opening and turbine speed is previously established and stored as a map in the memory of the microcomputer of the electronic control unit 100. After reading the line pressure (off-shifting line pressure), a duty rate determining subroutine is called for at step S24.

Duty Rate Determination Subroutine

Figure 8:
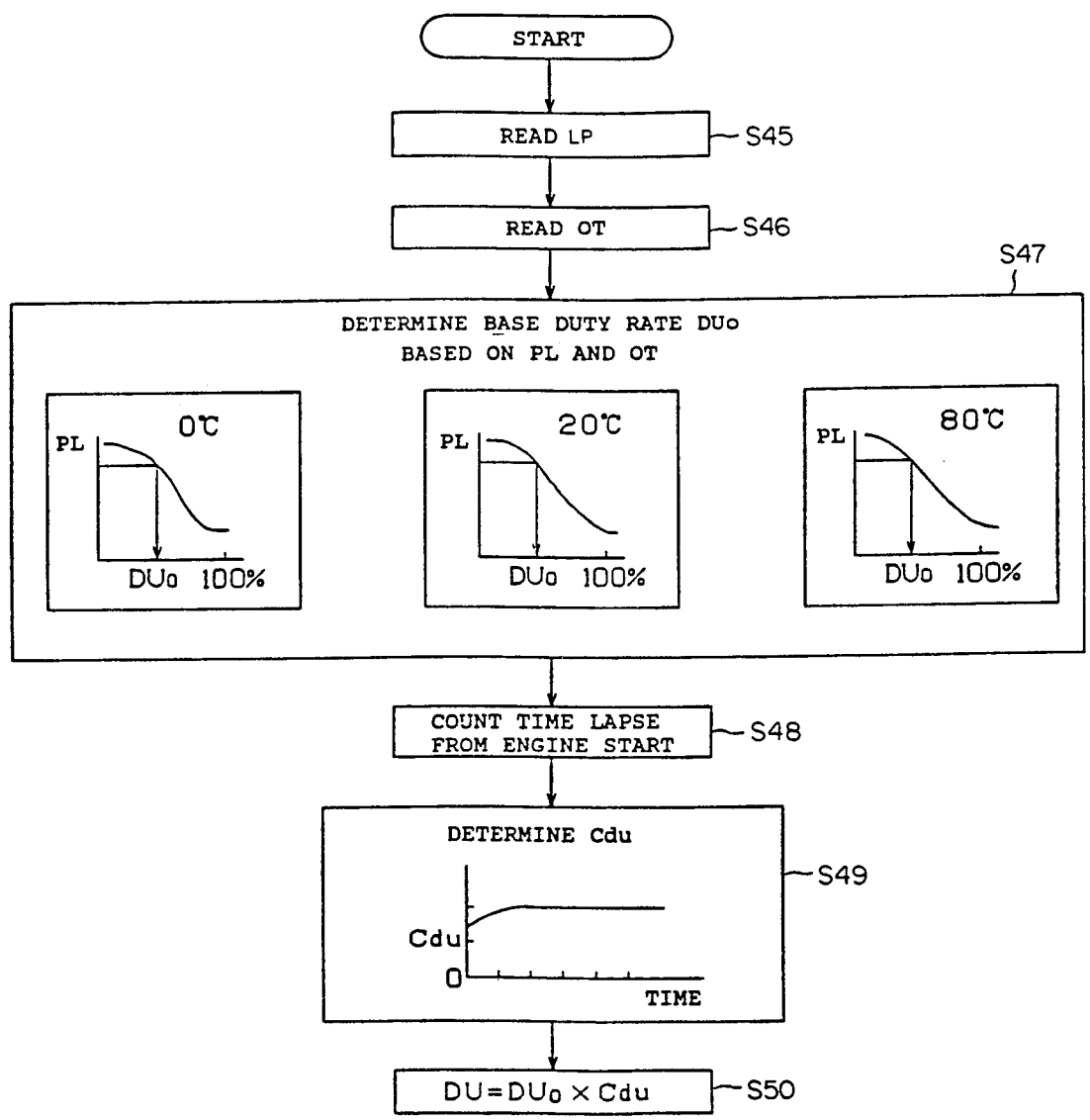
FIG. 8 is a flow chart illustrating a duty rate determining subroutine.

Referring to FIG. 8, which is a flow chart of the duty rate determining subroutine, after reading the line pressure (LP), which has been determined at the previous step, at step S45 and the temperature of an oil in the automatic transmission AT at step S46, a basic duty ratio or rate (DUo) of the duty solenoid valve 33 is determined according to the line pressure (LP) at the oil temperature. Because the relation of basic duty rate (DUo) to line pressure (LP) varies depending upon temperatures of the oil in the automatic transmission AT, data representing the relations of basic duty rate (DUo) to line pressure (LP) are previously established for several oil temperatures, such as 0, 20 and 80 degrees centigrade, and stored in the form of maps in the memory of the microcomputer of the electronic control unit 100. At step S47, the basic duty rate (DUo) for the line pressure (LP) at an actual specific oil temperature is actually determined by a linear interpolation with reference to two maps for oil temperatures between which the actual specific oil temperature lies.

Since the regulation of line pressure to duty rate is unstable due to the inclusion of air into the working oil a short period of time after starting the engine EN, the basic duty rate (DUo) should be corrected according to an elapsed time after the start of the engine EN. For this reason, after counting a time which has elapsed from the ignition of the engine EN at step S48, a duty rate correction coefficient Cdu is determined according the elapsed time (TIME) at step S49. Data representative of the relation of duty rate correction coefficient (Cdu) to elapsed time (TIME) is previously established and stored in the memory of the microcomputer of the electronic control unit 100. Finally, a virtual duty rate (DU) is calculated as the product of the basic duty rate (DUo) and the duty rate correction coefficient (Cdu) for the specific oil temperature at step S50. Then, the final step orders return to the off-shifting line pressure control subroutine.

Off-Shifting Line Pressure Control Subroutine—continued

Referring back to the off-shifting line pressure control subroutine in FIG. 6, after assigning a specific frequency (Fd) of energization of the duty solenoid valve 33, for example 35 Hz, at step S25, on which the duty solenoid valve 33 is to be actuated, a period of time of opening (ON-time), during which the duty solenoid valve 33 remains open, is calculated as the product of the drive cycle (Cd), which is the reciprocal of the frequency (Fd) of energization, and the virtual duty rate (DU) at step S26. Finally, the duty solenoid valve 33 is driven so as to open itself for the ON-time, thereby developing the off-shifting line pressure determined at step S23. Then, the final step orders return to the line pressure control main routine.

On-Shifting Line pressure Control Subroutine

Figure 7:
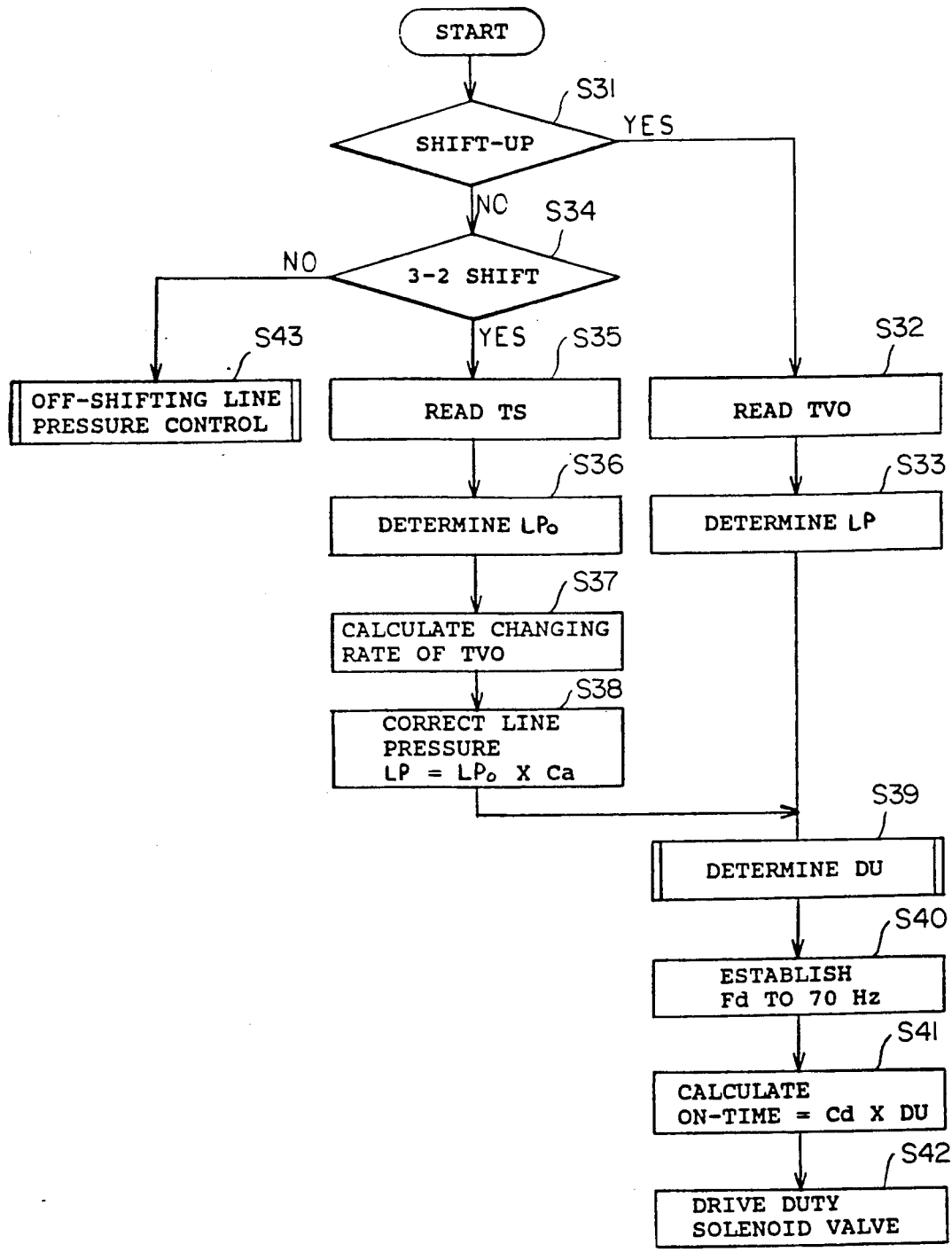
FIG. 7 is a flow chart illustrating an on-shifting line pressure control subroutine.
Figures 11A, 11B:
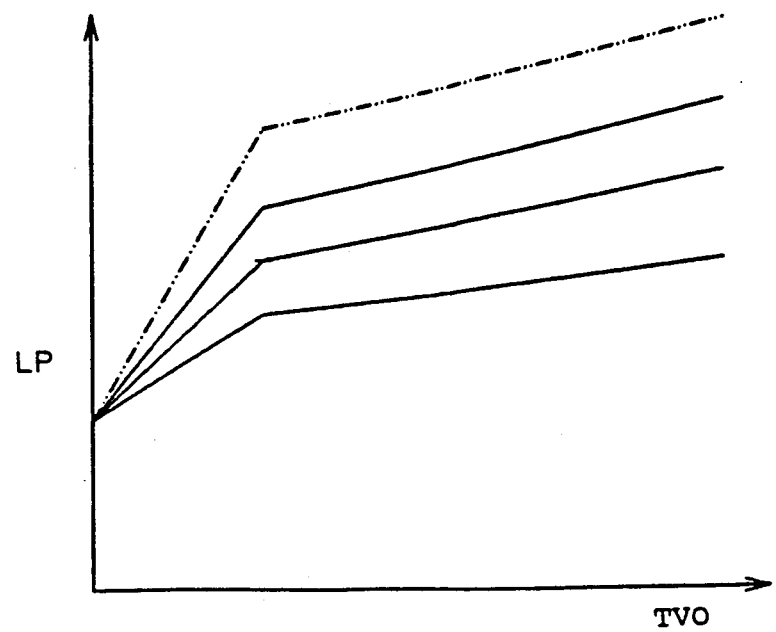
FIG. 11A is a table of line pressure assigned for various up shifting patterns.
FIG. 11B is a diagram showing the relation between line pressure and throttle opening.

Referring to FIG. 7, showing a flow chart of the on-shifting line pressure control subroutine which is called for at step S3 of line pressure control main routine in FIG. 5, the first step at S31 is to make a decision whether the automatic transmission AT is up-shifting. If the answer to the decision is yes, then, after reading a throttle valve opening based on a signal from the throttle opening sensor 101 at step S32, a desired line pressure (LP) for on-shifting line pressure control is determined at step S33 according to the throttle opening read at steps S32 and an up-shifting pattern. The line pressure for off-shifting line pressure control for each drive mode and up-shifting pattern according to throttle valve opening TVO is previously established as is shown in FIG. 11A and stored as a map in the memory of the microcomputer of the electronic control unit 100. A shift shock caused on the automatic transmission AT is related to the engine output, which depends upon throttle valve openings and shift patterns, and, in particular, upon the frictional elements or means which are actuated during shifting share different torques according to shift patterns. Consequently, if, as is conventional, the line pressure is determined independently of shift patterns, it is difficult to regulate the accumulators of the line pressure control circuit 30 so as to provide optimized times needed for the frictional elements of the automatic transmission AT to complete their coupling operation for every shift pattern. For this reason, the on-shifting line pressure is determined according to a throttle opening and an up-shifting pattern for each drive mode. Accordingly, as is shown in FIG. 11B, the on-shifting line pressures (LP) are established differently for shift patterns and are lower than the conventional on-shifting line pressure (LP) shown by a double dotted chain line which are sufficiently high to prevent all of the frictional elements or means from slipping during shifting. As was previously described, the line pressure (LP) is corrected for optimization in the line pressure learning control subroutine called for a step S11 of the line pressure control main routine in FIG. 5.

If the answer to the decision regarding up-shifting at step S31 is no, this indicates that the automatic transmission AT is down-shifting. Then, a decision is made at step S34 as to whether the automatic transmission AT is down-shifting from the third speed gear to the second speed gear. If in fact the automatic transmission AT is down-shifting from the third speed gear to the second speed gear, namely, the answer to the decision at step S34 is yes, then, an operation for correcting a line pressure is performed in steps S35 to S38. However, if the answer to the decision is no, the off-shifting line pressure control subroutine previously described with reference to FIG. 6 is called for at step S43.

In the automatic transmission At, controlled with the line pressure control circuit 30 shown in FIG. 2 and 4, respectively, when shifting down from the third speed gear to second speed gear, the 3-4 clutch means 27 is released and simultaneously the 2-4 brake means 23 is coupled. At this time, therefore, it is essential to regulate a timing at which the 2-4 brake means 23 is coupled. During down-shifting other than a down-shift from the third speed gear to second speed gear, it is necessary to release either the 3-4 clutch means 27 or the 2-4 brake means 23 only, and, accordingly, it is unnecessary to regulate the timing of coupling of the 2-4 brake means 23 with the line pressure. It is to be noted that if the automatic transmission is required to couple a specific frictional element simultaneously while releasing another frictional element during down-shifting from the third speed gear to second speed gear, a line pressure correction may be performed in steps S35 to S38.

Figures 12, 13:
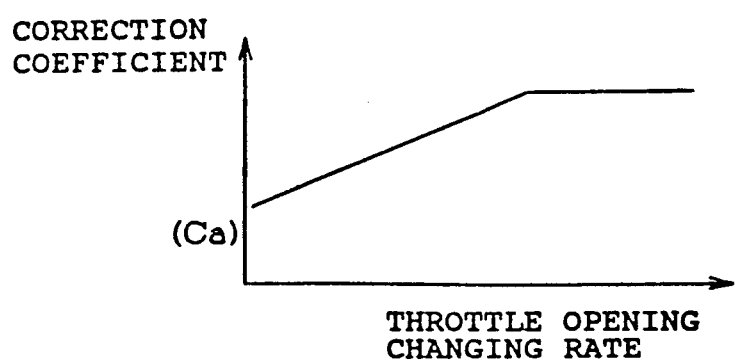
FIG. 12 is a table of base line pressure relative to turbine speed during down-shifting.
FIG. 13 is a diagram showing correction coefficient relative to changing rate of throttle opening.

When down-shifting from the third speed gear to the second speed gear, after reading a turbine speed based on a signal from the turbine speed sensor 102 at step S35, a base line pressure (LPo) is determined according to the read turbine speed at step S36. During down-shifting from the third speed gear to the second speed gear of the automatic transmission AT shown in FIG. 2, the 2-4 brake means 23 is coupled when the turbine 4 reaches an appropriate speed of rotation after the 3-4 clutch means 27 is released and places the automatic transmission AT in the neutral (N) range. Because a timing at which the 2-4 brake means 23 is coupled varies, depending on turbine speeds, the base line pressures (LPo) are previously established for various turbine speeds as is shown in FIG. 12 and stored as a map in the memory of the microcomputer of the electronic control unit 100.

Thereafter, after performing a calculation of a changing rate of throttle valve opening based on several consecutive signals from the throttle opening sensor 101 and reading a correction coefficient (Ca) according to the changing rate of throttle valve opening at step S37, a virtual line pressure (LP) is calculated as the product of the base line pressure (LPo) and the correction coefficient (Ca) at step S38. The correction coefficient (Ca) is previously established according to the changing rate of throttle valve opening as is shown in FIG. 13 and stored as a map in the memory of the microcomputer of the electronic control unit 100.

After determining the line pressure (on-shifting line pressure) either at step S33 or at step S38, the duty rate determining subroutine shown in FIG. 8 and described in the off-shifting line pressure control subroutine in FIG. 6 is called for at step S39.

In substantially the same manner as in the off-shifting line pressure control subroutine in FIG. 6, after assigning at step S25 a specific frequency (Fd) of energization of the duty solenoid valve 33, for example 70 Hz, at which the duty solenoid valve 33 is to be actuated, a period of time of opening or ON-time, during which the duty solenoid valve 33 is kept open, is calculated as the product of the drive cycle (Cd), which is the reciprocal of the frequency (Fd) of energization, and the virtual duty rate (DU) at step S41. Finally, the duty solenoid valve 33 is driven so as to open itself for the ON-time, thereby developing the on-shifting line pressure determined either at step S33 or at step S38. Then, the final step orders return to the line pressure control main routine.

Line Pressure Correction Subroutine

As was previously described, if the answer to the decision regarding up-shifting at step S6 or to the decision regarding the throttle opening at step S9 is no, or after the fuel cut control 105 provides a control signal for executing fuel cut for a half number of the cylinders of the engine EN at step S10, the line pressure correction subroutine is called for at step S11. The line pressure correction subroutine is executed in order to correct a line pressure (LP) stored in the memory when the automatic transmission AT shifts up from the first speed gear to the second speed gear or from the second speed gear to the third speed gear, both in the economy drive mode. During up-shifting, as the frictional elements are gradually coupled, the turbine 4 lowers its speed to a speed desired after up-shifting. A shift-time required to complete the upshifting of the automatic transmission AT depends upon a speed or a time necessary for the frictional elements to complete their couplings. Accordingly, the line pressure (LP) is corrected according to shift-time.

Figure 9:
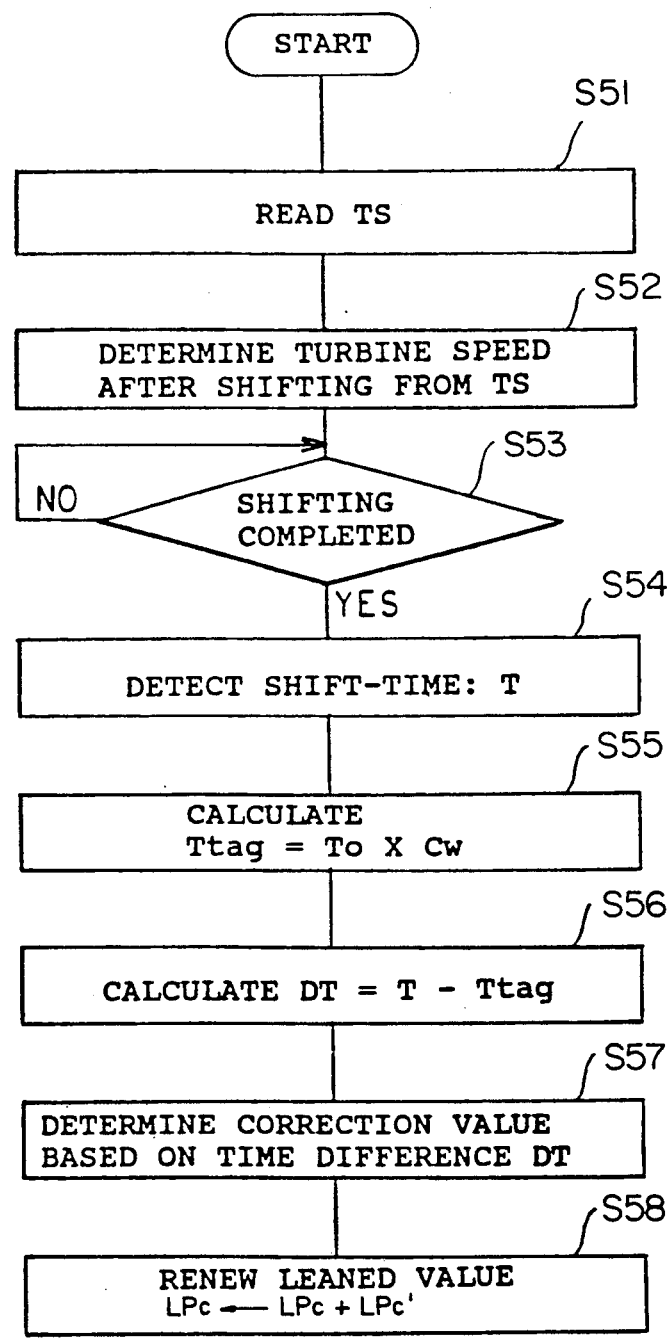
FIG. 9 is a flow chart illustrating a line pressure correction subroutine.

Referring to FIG. 9, which is a flow chart of the line pressure correction subroutine, after reading an actual turbine speed based on a signal from the turbine speed sensor 102 at step S51, a target turbine speed which is desired after up-shifting is calculated based on the actual turbine speed at step S52. Then, a decision is made at step S53 as to whether up-shifting is completed. The completion of up-shifting can be determined to occur when the difference between the actual turbine speed and the target turbine speed becomes less than a specific speed and when a rate of change in turbine speed becomes less than a specific rate. If the answer to the decision is no, another decision is made until the answer becomes yes. When the answer to the decision is yes, this indicates that the automatic transmission AT has completed its up-shifting. Then, a shift-time (T) required to perform the up-shifting is measured at step S54.

Figures 14, 15:
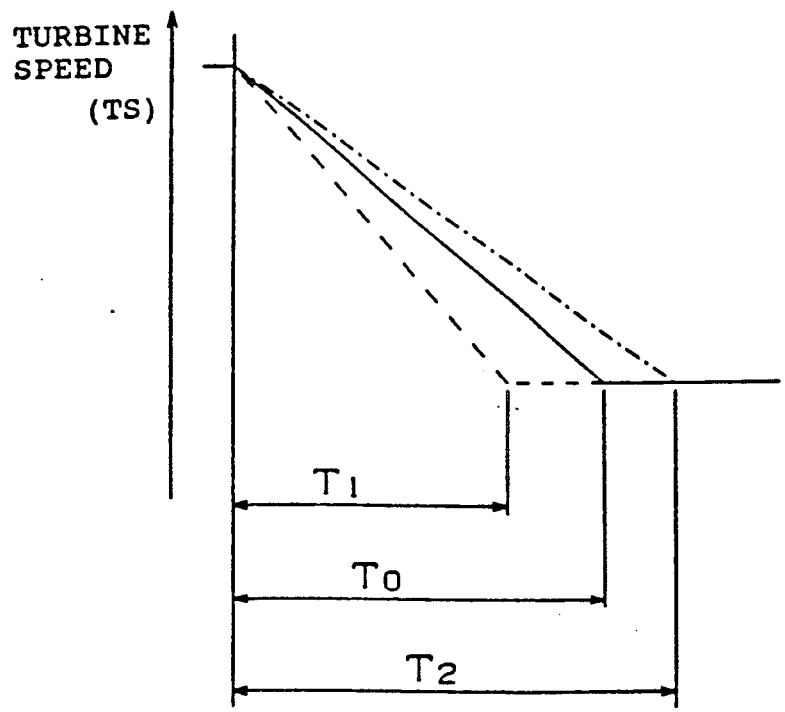
FIG. 14 is a diagram showing changes of turbine speed during up-shifting.
FIG. 15 is a table of target shift-time for various up-shift patterns.
Figures 16, 17:
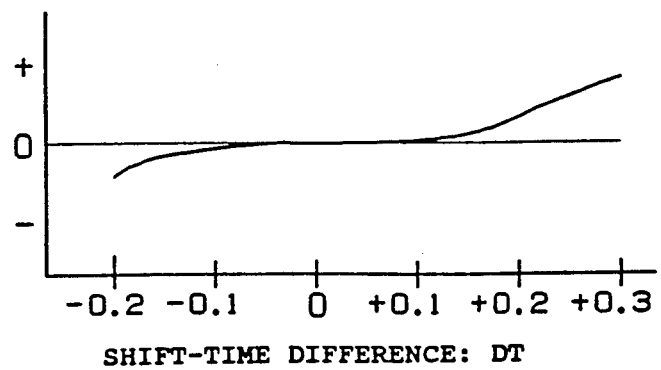
FIG. 16 is a table of weighing coefficient for various throttle openings.
FIG. 17 is a diagram showing line pressure correction values for various differences of shifting times.

At step S55, an optimum shift-time Ttag is calculated as the product of a target shift-time To and a weighing coefficient Cw. The target shift-time To is established so as to provide the turbine 4 with an appropriate change in turbine speed as shown by a solid line in FIG. 14. As is shown in FIG. 15, the target shift-time To is previously established for each up-shift pattern and stored as a map in the memory of the microcomputer of the electronic control unit 100. The weighing coefficient Cw is previously established and is different for various throttle valve openings. That is, the weighing coefficient Cw is fixed at a value of 1 for a throttle valve opening between 6/8 and 8/8 of its full opening and increases with a decrease in throttle valve opening as is shown in FIG. 16 wherein values of a are different and $a5 > a4 > a3 > a2 > a1$.

After the calculation of the optimum shift-time Ttag, the time difference DT is calculated by subtracting the optimum shift-time Ttag from the measured shift-time T at step S56. A line pressure correction value (LPc) is read according to the time difference DT from a map previously established and stored as a map (shown in FIG. 17) in the memory of the microcomputer of the electronic control unit 100 at step S57. As is apparent from FIG. 17, if the time difference DT is close to zero (0), the line pressure correction value (LPc) is set to zero. If the time difference DT is negative, this indicates that the measured shift-time is short, as is shown by a time T1 in FIG. 14. Then, the line pressure correction value (LPc) is set to a negative value. On the other hand, if the time difference DT is positive, this indicates that the measured shift-time is long, as is shown by a time T2 in FIG. 14. Then, the line pressure correction value (LPc) is set to a positive value.

Finally, at step S58, a learning line pressure correction value (LPc) is calculated for a specific shift pattern as the sum of the line pressure correction value (LPc) and the previous learning line pressure correction value (LPc') for the specific shift pattern and stored as a new learning line pressure correction value (LPc) for the specific shift pattern for another line pressure control. The final step orders return to the line pressure control main routine.

It is to be understood that although the present invention has been fully described with respect to a preferred embodiment thereof, various other embodiments and variants are possible which fall within the scope and spirit of the invention, and such other embodiments and variants are intended to be covered by the following claims.

What is claimed is:

1. An automatic transmission system comprising:
a multi gear ratio transmission mechanism including a plurality of friction coupling elements;
a multi cylinder engine for use with said transmission mechanism;
a hydraulic pressure regulator for regulating a line pressure delivered to the friction coupling elements of the multi gear ratio transmission mechanism, said friction coupling elements being selectively coupled and released so as to place the transmission mechanism into any desired gear ratio;
and control means for controlling an operation of said hydraulic pressure regulator, said control means (1) correcting said line pressure according to a learned correction value which is determined depending upon a shift-time taken by said transmission mechanism to complete a shift between gear ratios so as to complete the shift between gear ratios in an optimum shift-time, (2) ordering fuel delivery cut off for a number of engine cylinders which is different according to shift patterns of said multi gear ratio transmission mechanism, (3) judging whether the number of engine cylinders for which fuel delivery cut off is ordered is smaller than a predetermined number, and (4) executing a correction of said line pressure in learning control when the number is smaller than said predetermined number.

2. An automatic transmission system as recited in claim 1, and further comprising a throttle valve and throttle opening detection means for detecting throttle openings of said throttle valve.

3. An automatic transmission system as recited in claim 2, wherein said control means further detects up-shifting patterns of said transmission mechanism and performs the line pressure learning control.

4. An automatic transmission system as recited in claim 3, wherein said optimum shift-time is changed according to said up-shifting patterns.

5. An automatic transmission system as recited in claim 4, wherein said optimum shift-time is made shorter as a gear ratio to which said transmission mechanism is shifted becomes higher.

6. An automatic transmission system as recited in claim 3, wherein said optimum shift-time is changed according to said throttle openings.

7. An automatic transmission system a recited in claim 6, wherein said optimum shift-time is made shorter as a throttle opening becomes larger.

8. An automatic transmission system as recited in claim 7, wherein said number of engine cylinders for which fuel delivery is cut off is changed depending upon said throttle openings.

9. A line pressure control system as recited in claim 3, wherein said number of engine cylinders for which fuel delivery is cut off is changed depending upon said throttle openings.

10. An automatic transmission system as recited in claim 9, wherein said number of engine cylinders for which fuel delivery is cut off is made smaller as a throttle opening becomes larger.

11. An automatic transmission system as recited in claim 9, wherein said control means orders fuel delivery cut off for all engine cylinders when said throttle valve is at larger openings, for half the engine cylinders when said throttle valve is at medium openings, and for no engine cylinders when said throttle valve is at smaller openings.

12. An automatic transmission system as recited in claim 3, wherein said optimum shift-time is changed depending upon said throttle openings.

13. An automatic transmission system as recited in claim 12, wherein said optimum shift-time is made shorter as a throttle opening becomes larger.

* * * * *